May 10, 1927.
C. H. KRENGEL
1,628,158
AGRICULTURAL IMPLEMENT
Filed May 18, 1926
2 Sheets-Sheet 1
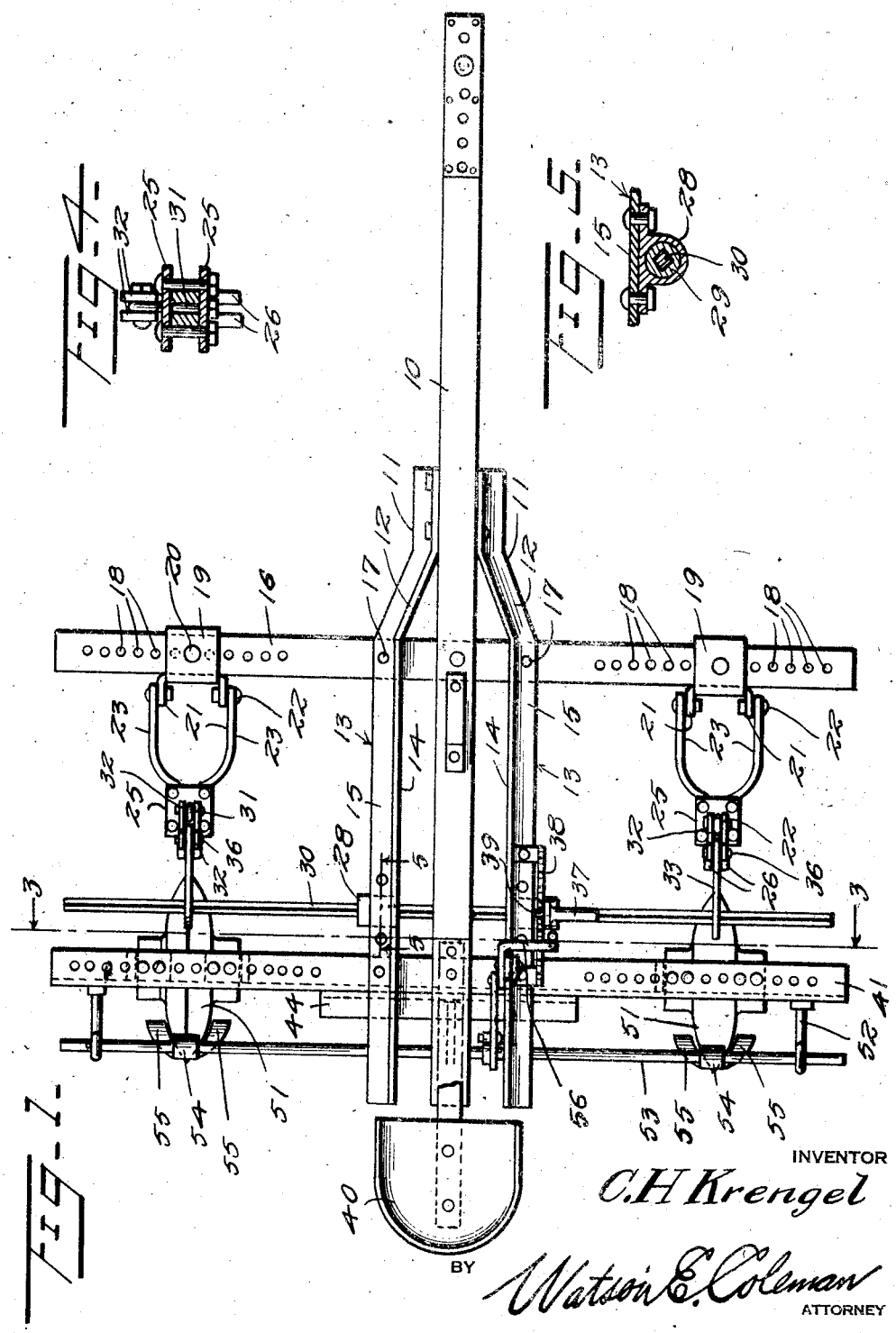
INVENTOR
C.H. Krengel
BY
Watson E. Coleman
ATTORNEY

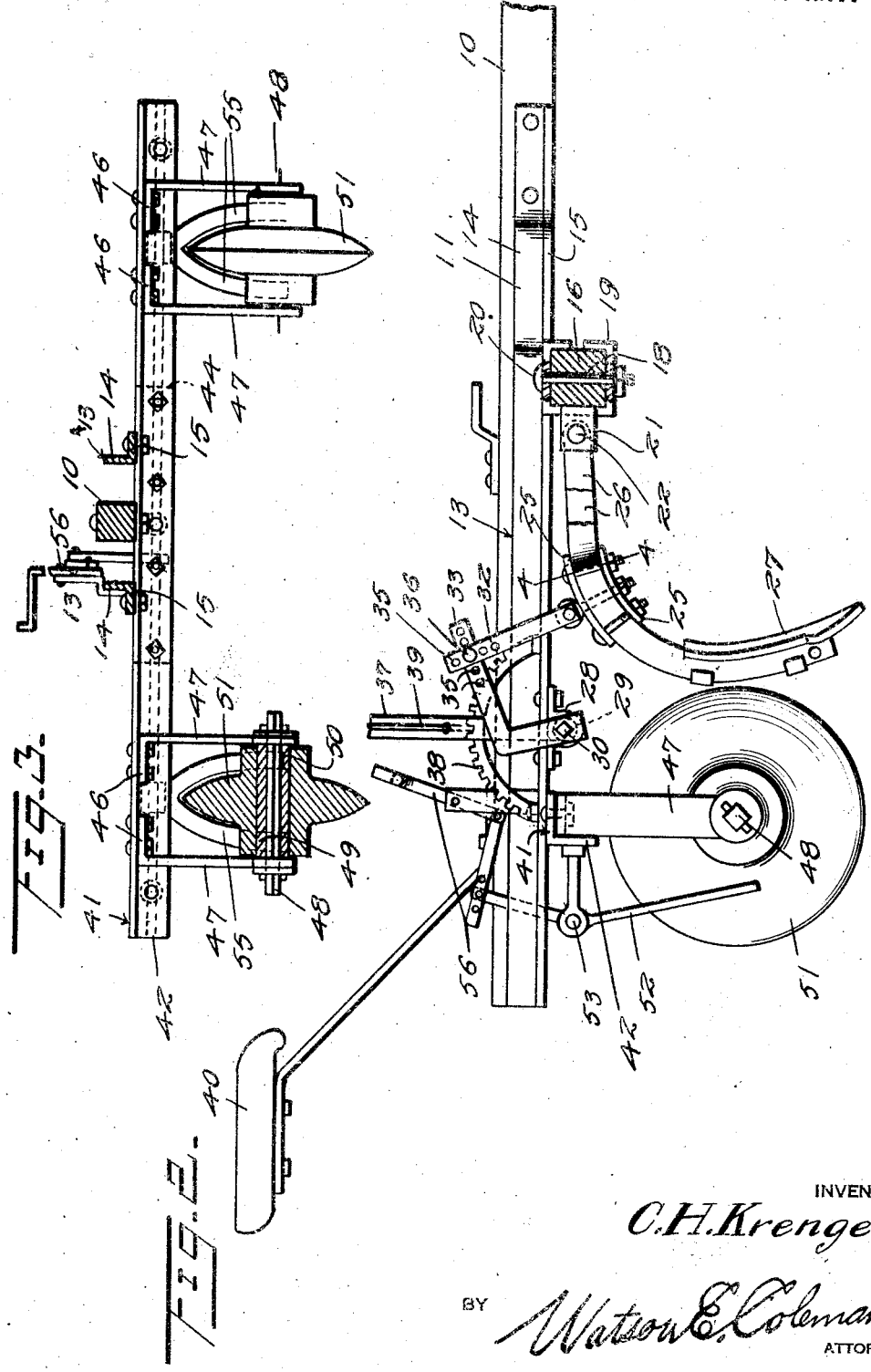

Patented May 10, 1927.

1,628,158

UNITED STATES PATENT OFFICE.

CHARLES H. KRENGEL, OF TWIN FALLS, IDAHO.

AGRICULTURAL IMPLEMENT.

Application filed May 18, 1926. Serial No. 109,971.

This invention relates to agricultural implements and more particularly to a corrugating machine.

An important object of the invention is to provide a device of this character which may be very cheaply and readily produced and which is capable of a wide range of adjustment to regulate the distance between adjacent corrugations.

A further object of the invention is to produce a device of this character which may be so constructed that it is very short-coupled, thereby reducing the distance through which the corrugations must be made by hand at the ends of the field.

A further object of the invention is to produce a device of this character, the several parts of which are so mounted that they are very rigidly held and do not tend to get out of alignment during operation.

These and other objects I attend by the construction shown in the accompanying drawings, wherein for the purpose of illustration is shown a preferred embodiment of my invention and wherein:—

Figure 1 is a plan view of a corrugating machine constructed in accordance with my invention;

Figure 2 is a side elevation thereof;

Figure 3 is a section on the line 3—3 of Figure 1;

Figure 4 is a section on the line 4—4 of Figure 2;

Figure 5 is a section on the line 5—5 of Figure 1.

Referring now more particularly to the drawings, the numeral 10 generally designates a wooden tongue to which is secured the forward ends of angle iron frame beams 11. Adjacent their forward ends, the angle iron frame beams which are arranged upon opposite sides of the tongue 10, diverge, as indicated at 12 and rearwardly of these diverging portions have portions 13 paralleling the tongue. Each angle iron frame beam 12 has its vertical angle 14 inwardly arranged and its horizontal angle 15 arranged at its lower face and in the same plane as the under surface of the tongue 10.

A transverse beam 16 underlies the flanges 15 and the tongue in alignment with the forward ends of the parallel portions 13 and is secured to the flanges 15 as by bolts 17. Outward of the frame beams, the ends of the beam 16 are provided with longitudinally spaced openings 18, the purpose of which will presently appear.

Embracing each end of the beam is a yoke 19 which may be held in adjusted positions upon the beam by means of bolts 20 directed through the yoke and a selected opening 18 of the beam. Each yoke 19 embodies a pair of rearwardly directed ears 21 through which is directed a pivot bolt 22. Upon the ends of each pivot bolt outwardly of the ears 21 are arranged bars 23, the rear ends of which are offset toward one another, as at 24, and secured together by clamping plates 25. Rearwardly of the clamping plates, the bars 23 curve downwardly, as at 26, to provide a mounting for shovels 27.

Rotatably mounted in bearings 28 secured to the under surface of the horizontal flanges 15 of the frame beams adjacent the rear ends of the parallel portions thereof are sleeves 29 through which is directed a square shaft 30 secured to each of the sleeves. Directed through each pair of plates 25 and assisting in maintaining the same in assembled relation is an eye bolt 31, the eye of which is upwardly directed and has connected thereto one end of a link 32. Secured to the shaft 30 in alignment with each eye bolt is an arm 33, the upper end of which extends forwardly over the eye bolt and pivotally engages with the upper end of the link. Each link and the coacting end of the arm are provided with series of openings 34 and 35 in which the pivotal connection 36 may be selectively engaged to regulate the position of the shovel 27 in any given position of the shaft 30. The position of the shaft is determined by means of a lever 37 secured at its lower end to the shaft and coacting with a segment 38. The usual latch and control mechanism 39 is provided for maintaining the lever in adjusted positions and the lever is so arranged as to be convenient to a seat 40 supported from the rear end of the tongue 10.

Secured to the rear ends of the parallel portions 13 of the frame beams and abutting the under surfaces of the horizontal flanges 15 and the under surface of the tongue is a transversely disposed angle iron bar 41. This bar has its vertical flange 42 downwardly directed and the ends of its horizontal flange are provided with a series of longitudinally spaced openings 43. To the rear ends of the parallel portions 13 is secured a short length of angle iron 44, the vertical flange 45 of which is downwardly directed and rigidly secured to the vertical flange of the bar 41 to reinforce the same. The openings 43 of each end of the bar 41 provide a means for securing against the under surface of the horizontal flange of this bar the angular upper ends 46 of vertical standards 47, the upper end portions of which abut against the vertical flange 42 of the bar 41 and the lower ends of which provide mountings for the ends of squared shafts 48. This shaft between the standards has mounted thereon a bushing 49 fitting the shaft and rotatably fitting with its exterior the opening 50 of a packer wheel 51. Attention is directed to the fact that the mountings of the standards 46 prevent the strain tending to move the packer wheel 51 rearwardly from being transmitted directly to and borne entirely by the securing elements by means of which the standards are secured to the bar 41.

Adjacent each end of the bar 41 an eye bolt 52 having its eye in its rear end is secured at its forward end in the vertical flange 42 of the bar and rotatably receives one end of a transverse shaft 53 having scraper blades 54 corresponding in number and arrangement to the packer wheels. The connection of the scraper blades with the shaft is adjustable, so that they may be shifted to correspond to shifting on the mountings of the associated packer wheel. Each scraper blade is provided with downwardly diverging arms 55, one for coaction with each side face of the packer wheel. The shaft may be rotated by means of a foot treadle 56 to throw these scraper blades into engagement with the associated packer wheel in event earth tends to collect thereon.

In the use of the device, it will be obvious that the shovels and their associated packer wheels may be adjusted to provide any desired width between adjacent corrugations and that the depth of the corrugation may be regulated by the setting of the shovels. It will be obvious that such a device may be very cheaply and readily produced and at the same time a durable and efficient structure provided.

Since the construction hereinbefore set forth is obviously capable of a certain range of change and modification without materially departing from the spirit of the invention, I do not limit myself to such specific structure except as hereinafter claimed.

I claim:—

1. In a corrugating machine, a frame including longitudinally extending members, longitudinally spaced transversely extending bars secured to the longitudinally extending members and having their ends projecting therebeyond, a shovel beam pivotally connected with each end of the foremost transverse bar by a connection adjustable longitudinally along the bar, a packer wheel mounted in bearings secured to the rearmost bar, the bearings being adjustable along the bar to permit the packer wheels to align with the shovels, a transverse shaft rotatably mounted in bearings supported from the longitudinally extending members, arms adjustable longitudinally of said shafts and connections between said arms and the associated shovel beams.

2. In a corrugating machine, a frame including longitudinally extending members, longitudinally spaced transversely extending bars secured to the longitudinally extending members and having their ends projecting therebeyond, a shovel beam pivotally connected with each end of the foremost transverse bar by a connection adjustable longitudinally along the bar, a packer wheel mounted in bearings secured to the rearmost bar, the bearings being adjustable along the bar to permit the packer wheels to align with the shovels, the rear transverse bar comprising an angle bar having the vertical flange thereof rearwardly disposed and downwardly directed, the pivotal supports for the packer wheels including standards having their upper ends angularly bent to engage against the under surface of the horizontal flange of the angle bar and be secured thereto, the upper ends of the standards abutting the forward face of the vertical flange of the bar to thereby resist tendency toward rearward movement of the lower ends of the standards and of the packer wheels mounted therebetween.

3. In a corrugating machine, a frame including longitudinally extending members, longitudinally spaced transversely extending bars secured to the longitudinally extending members and having their ends projecting therebeyond, a shovel beam pivotally connected with each end of the foremost transverse bar by a connection adjustable longitudinally along the bar, a packer wheel mounted in bearings secured to the rearmost bar, the bearings being adjustable along the bar to permit the packer wheels to align with the shovels, said shovel beams each embodying spaced bars, the pivotal connection of the beams with the first mentioned transverse bar each comprising a yoke slidable upon the transverse bar and having means whereby it may be secured in adjusted positions thereon, a yoke embodying spaced rearwardly directed ears and a bolt directed through said ears and the bars of the associated shovel beam.

In testimony whereof I hereunto affix my signature.

CHARLES H. KRENGEL.